3,058,967
Patented Oct. 16, 1962

3,058,967
METHOD OF CONVERTING POWDERED POLYMERS TO GRANULAR FORM
Mortimer H. Nickerson, 310 Fountain St., Springfield, Mass.
No Drawing. Filed Mar. 2, 1954, Ser. No. 413,720
4 Claims. (Cl. 260—92.1)

This invention relates to a method of converting thermoplastic molding materials from a powder form to the form of densified granules. This application is a continuation-in-part of my prior, copending application Serial No. 277,720, filed March 20, 1952, now Patent Number 2,851,407.

In order to carry out forming operations such as extrusion or injection molding of thermoplastic materials, it has been found advantageous and desirable that they be in the form of densified granules. Materials which are in the form of a fine powder are particularly objectionable, not only from the dust nuisance effect but also from the possibility of loss of valuable material as airborne powder. In addition, fine powders generally have what is known as a low-bulk density; that is, the apparent density of the powder is considerably lower than that of the finished molded or extruded piece. Mechanically that means that the machine which fuses and forms the polymeric material must do a considerable amount of work compressing the powder. Most injection molding and extruding machines are not so mechanically designed that they have sufficient volume capacity to permit considerable compression of a fine powder before fusion takes place, unless they have been specially designed for this purpose.

It is the purpose of this invention to provide a method of readily converting such fine powders to a granular form having sufficiently high bulk density to render them suitable for use in extrusion or injection machines. More specifically, it is the purpose of this invention to provide such methods for polymeric chlorotrifluoroethylene.

In the polymerization method disclosed in said copending application Serial No. 277,720, the polymerization of the chlorotrifluoroethylene is effected in a water dispersion. The product from the above polymerization is a fine white powder or aggregates thereof. Because of the absence of side reactions on the polymerization and the absence of any dispersing or suspending agent, coupled with the fact that the hydrogen peroxide catalyst used is a volatile material, the polymer purification is greatly simplified and the product can be simply washed either on a filter or in a centrifuge, the product thus being recovered from the water dispersion, in which it was polymerized, in a moist form. Upon drying, the polymeric chlorotrifluoroethylene is obtained in final form as a fine white powder. This form is excellent for making dispersions as described in my copending application Serial No. 330,350, filed January 8, 1953, but suffers from the disadvantages mentioned above when used for injection or extrusion. Other processes for making polychlorotrifluoroethylene have been proposed which also lead to powders, and the following described procedures are applicable to comparable powders however produced.

One method which has been used for converting powdered form of chlorotrifluoroethylene polymer to a granular form is to extrude the powder at minimum temperatures to achieve only the barest amount of fusion. Starting with the powder, the operation of the extruder is quite inefficient. However, considerable densification does take place and the extruded material when properly comminuted in a chopper does produce granules adequate for injection or extrusion of finished articles. Aside from the expensiveness of such an operation, it also results in another disadvantage in that when the polymer is finally obtained in a form suitable for use it already has a history of heat treatment and mechanical working which may in the case of polychlorotrifluoroethylene, for example, have resulted in some degradation of the properties of the polymer.

I have found that the powdered polychlorotrifluoroethylene produced by the method disclosed in said application Serial No. 277,720, and by other methods which produce the polymer in similar form may be converted into a much more convenient form if it is exposed in the form of a relatively thin layer to a temperature between 450° F. and 575° F. Under these conditions the material partially melts or sinters to a loosely formed cake which, when subsequently ground up in a mechanical chopping device fitted with a coarse screen, yields a material having the general appearance of coarse sand or fine gravel. This treatment completely eliminates the original dusty character, together with the tendency of the powder to pack and "bridge" in the hopper of an extruder or injection molding machine. The sand-like material obtained by sintering flows freely and behaves in a highly desirable manner in the screw of an extruder. Care must be exercised that the polymer is not exposed to temperatures above 575° F. for an excessive period of time since the effect of very high temperatures upon this polymer is to cause a degradation of molecular weight. When the sintering operation is carried out properly as herein described, the degradation is slight and the granular product will be found to have substantially the same molecular weight as the original material. Any slight loss in molecular weight is more than compensated for by the improved handling characteristics of the polymer. If desired, and it is most convenient to do so, the polymer recovered in moist form from the water dispersion in which it was polymerized may be dried and sintered in the same operation.

The following exemplifies one manner of carrying out, in accordance with the method of the present invention, the conversion of the polymer to an improved form for handling. The washed and dried powdered polymer, having an NST value of 300, was spread out uniformly on trays to a depth of ⅜ of an inch, approximately 7 pounds of the polymer covering a tray area of approximately 20 inches by 40 inches. The trays used were, and preferably are, coated with a fused continuous film of polytetrafluoroethylene to permit easy separation of the sintered polymer from the surface. The trays were then inserted between two electrically heated metal plates, approximately 2 to 3 inches apart. These plates were essentially the same size as the trays and were maintained at a temperature of 500° F. After 20 to 25 minutes the trays were withdrawn, and the loosely sintered cake broken up into smaller pieces for feeding to a chopper or other mechanical disintegrator, which reduced the cake to a free-flowing granular material free of dust.

As stated, the polymer may be both dried and sintered in one operation by the above procedures. In that case a somewhat longer time in the oven will be necessary to permit evaporation of water.

Polymers of chlorotrifluoroethylene are usually classified according to their NST value. This NST value is the temperature under which a molded strip of a polymer, which is notched to cross sectional dimensions measuring ³⁄₆₄″ x ¹⁄₁₆″, parts at the notch under a load of 0.5 gram. The higher the NST the higher the molecular weight is considered to be.

Most commercial polychlorotrifluoroethylenes range in molecular weight from an NST value of 240 to 300. In general, the NST value is also a measure of the softening point of the resin. It will be appreciated that sintering times and temperatures as described above will vary depending upon the softening point of the resin which is being handled in this manner. Reasonable changes in times and temperatures departing from the above example are therefore logically to be made, and these changes are within the scope of the invention. For example, a sintering time of 20 minutes at a temperature of 475° F. may be completely adequate for a polymer having an NST of 240. On the other hand, polymer having an NST of 300 or higher may require as much as 30 minutes at a temperature of 500° F. The degree of sintering is physically apparent upon inspection of the sintered sheet as it comes from the tray, and adjustments of times and temperatures are made by the operator accordingly to obtain the desired or proper degree of sintering.

Sintering as the term implies, and as here used, is the conversion of a loose fine powder into a coherent body as the result of free heating without complete liquification or melting of the particles. I have found that, when subjected to sintering temperatures, finely powdered polychlorotrifluoroethylene, particularly when such material is recovered in moist or dry form from polymerization in a water dispersion as described in copending application Serial No. 277,720, or by similar water dispersion methods, the finely powdered polymer particles coalesce into granules which in turn cohere to form an aggregate, unitary mass which is easily reduced to the desired granule size by mechanical means. I have further found that, as compared with the above mentioned extruder method of converting the powdered polymer to granular form, the sintering method of the present invention subjects the polymer to far less severe heat and mechanical working conditions, and that as a result the product is not degraded nor does it lose any of the inherent physical properties it possesses as polymerized. The reduction in molecular weight, resulting from the conversion, is minimized and is of the order of only 5° C. as measured by the NST.

The relative simplicity of the method makes possible not only savings in manufacturing costs but affords easier product control resulting in a higher and more uniform quality of product. While the sintering temperature as above pointed out increases with the molecular weight of the polymer it is in any case less than that at which substantial degradation occurs and can be kept at a minimum by adjustment of the time of exposure and the thickness of the layer of material. For best results the layer should not exceed ½" and preferably is of the order of ⅜". The sintering temperatures being at least sufficient for drying purposes, the present invention for the first time makes possible the direct production of polychlorotrifluoroethylene in a dust-free granular form.

What is claimed is:

1. The method of directly converting polychlorotrifluoroethylene having an NST above 240 and recovered from the reactor as a fine white powder, to a granular form suitable for use in extrusion or injection molding machines, and without substantial degradation of the polymer, whcih comprises spreading the polymer as so recovered in a layer up to approximately ⅜ of an inch thick, heating the layer to a temperature only slightly above the softening point of the resin until the polymer particles form a loose frangible granular cake and mechanically reducing such cake to a free flowing granular form, dust free and of higher bulk density than the powder as recovered from the reactor.

2. The method of producing granular polychlorotrifluoroethylene having an NST above 240 which comprises polymerizing monomeric chlorotrifluoroethylene in a water dispersion to such NST and under conditions for recovery of the polymeric product in the form of a washed moist fine white powder, spreading the polymer as so recovered in a layer up to approximately ⅜ of an inch thick, heating the layer to a temperature only slightly above the softening point of the resin until the polymer particles form a loose frangible granular cake without substantial degradation of the polymer and mechanically reducing such cake to a free flowing granular form dust free and of higher bulk density than the powder as recovered from the reactor, suitable for use in extrusion or injection molding machines.

3. The process for increasing the bulk density of polychlorotrifluoroethylene which comprises spreading the polymer in a layer approximating ⅜ of an inch in thickness on a tray, heating said layer in an oven to a temperature only sufficiently above the melting point of the polymer to transform the layer into a frangible sintered mass, and mechanically reducing said mass to granular form.

4. A process for increasing the bulk density of a solid homopolymer of chlorotrifluoroethylene which comprises spreading the polymer in the form of a powder in a thin layer, heating said layer to a temperature of from 232 to 302° C. to form a sintered mass and mechanically reducing said mass to granular form.

References Cited in the file of this patent

UNITED STATES PATENTS

| | | |
|---|---|---|
| 2,573,639 | Coler | Oct. 30, 1951 |
| 2,617,149 | Rubin | Nov. 11, 1952 |
| 2,617,150 | Rubin | Nov. 11, 1952 |
| 2,643,988 | Walter | June 30, 1953 |

OTHER REFERENCES

Schack: "A Manual of Plastics and Resins," page 376, Chem. Pub. Co. (1950).

Reysen et al.: "Modern Plastics," page 102 (1951).